(No Model.)
A. HITT.
ROAD CART.
No. 288,805. Patented Nov. 20, 1883.
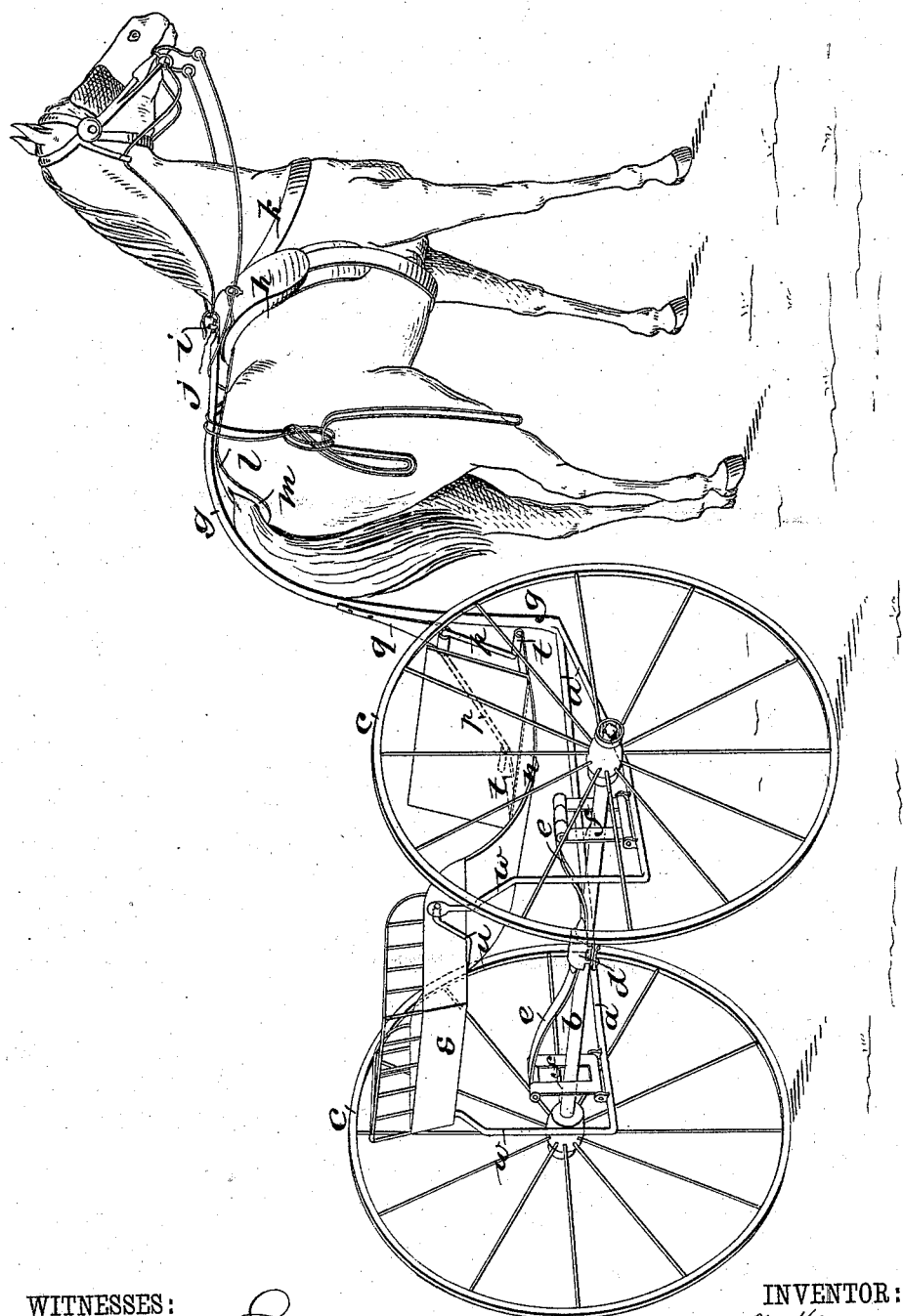
WITNESSES:
INVENTOR:
A. Hitt
BY Munn & Co
ATTORNEYS.

UNITED STATES PATENT OFFICE.

ADRIAN HITT, OF RUSHVILLE, ASSIGNOR TO HIMSELF, AND TERRENCE McMANUS, OF SEXTON, INDIANA.

ROAD-CART.

SPECIFICATION forming part of Letters Patent No. 288,805, dated November 20, 1883.

Application filed September 21, 1883. (No model.)

*To all whom it may concern:*

Be it known that I, ADRIAN HITT, of Rushville, in the county of Rush and State of Indiana, have invented a new and Improved Road-Cart, of which the following is a full, clear, and exact description.

My invention consists of shafts which unite by a fork in one pole a little in advance of the body, which pole curves upward therefrom over and along the back of the horse to the back-saddle of the harness, where it is connected to the saddle by a pivot, and the saddle has a breast-strap which applies the draft to said back-strap near the point where the pole is connected, also a back-strap and crupper to prevent the pole from shifting the back-strap forward, together with a simple and efficient contrivance for the connection of the body to the shafts and the pole, and for connecting the shafts and the spring, whereby it is designed to provide an easier-riding and more simple and substantial cart than others now in use, and to enable a simpler harness to be used, all as hereinafter fully described.

Reference is to be had to the accompanying drawing, forming part of this specification, in which the figure is a perspective view of my improved road-cart hitched to a horse.

The shafts $a$ range under the axle $b$, near the wheels $c$, and parallel to them for a short distance, and are suspended thereat from the ends of the flat bow-spring $e$, arranged over and along the axle and secured to it at the center by clip $d$, the said shafts being suspended by the slotted hangers $f$, which embrace both sides of the axle and form the connection by which the draft is applied to the axle and wheels. They also prevent any forward and backward play of the shafts and axle with relation to each other, while they allow the requisite vertical vibration of the one to the other for the action of the spring. A short distance in advance of the axle the shafts $a$ converge to and join in a single pole, $g$, which turns directly upward from the point of the junction of the shafts, and curves forward over the rump of the horse and along his back to the back-saddle $h$, whereto it is secured by a pivot-stud, $i$, and a pin, $j$, or it may be by a ball-and-socket joint of any kind, to allow the requisite articulation for such a point of connection.

From the top of the back-saddle a breast-strap, $k$, extends around the breast and shoulders of the horse, for applying the draft to the saddle, and a back-strap, $l$, and crupper $m$ hold the saddle against being thrust forward, said breast-strap being connected to the saddle at the point where the draft will be most direct on the pole.

The front end of the body $n$ is suspended from the upwardly-extending portion of the pole by the double-cranked rod $p$ and the elastic eye-strap $q$, attached to the pole, said cranked rod $p$ connecting at its ends with the eye-plates $t$, fixed to and projecting beyond the body of the cart. The rear portion of the body—that is to say, the seat $s$—rests on the cranked rod $u$, which is pivoted at its ends in the upper ends of the upright extensions $w$ of the shafts $a$, back of the axle. The body may therefore vibrate on the cranks $u$ and $p$, or, rather, rest on said cranks, while the pole and shafts are subject to vibration by the vertical motion of the horse, so that little or no effect of such vibration will be felt by the body.

It will be seen that by the arrangement of the shafts in a pole-extension over the back of the horse the vehicle itself is simplified, and it enables a simpler harness to be used, the traces, thill-straps, and whiffletree being dispensed with.

Having thus described my invention, what I claim as new, and desire to secure by Letters Patent, is—

1. The improvement in road-carts, consisting of the converging shafts $a$, forming a pole, $g$, and said pole extended upward and forward, and adapted to be connected to the back-saddle $h$ of the harness, for hitching the horse to the cart, substantially as described.

2. The shafts $a$, suspended under the axle $b$ from the spring $e$ by the slotted hangers $f$, embracing the axle, and thereby forming the means of applying the draft to the axle, and also preventing forward and backward play of the axle and shafts with relation to each other, substantially as described.

3. The shafts $a$, suspended under the axle $b$ from the spring $e$ by the slotted hangers $f$, and being joined in a pole-extension forward of the body, and arranged to connect with the back-saddle, substantially as described.

4. The body suspended at the forward end from the upwardly-extending portion of the pole g, and supported at the rear on the upward extensions of the shafts behind the axle, substantially as described.

5. The body connected at the front end by the cranked and pivoted rod p with the pole g, extending upward and along the back of the horse, and supported at the rear end on the cranked rod u, pivoted in the uprights w of the shafts, substantially as described.

6. The shafts of a road-cart, formed in a pole-extension ranging up over and along the back of the horse, and being connected to the back-saddle h, substantially as described.

7. The shafts of a road-cart, formed in a pole-extension ranging up over and along the back of the horse and connected to the back-saddle, and said back-saddle having a breast-strap, k, connected to it near the point where the pole is connected to said saddle, substantially as described.

8. The shafts of a road-cart, formed in a pole-extension ranging up over and along the back of the horse and connected to the back-saddle, said saddle having a breast-strap, k, back-strap l, and crupper m, combined and arranged substantially as described.

ADRIAN HITT.

Witnesses:
GEORGE M. CULVER,
HENRY L. GOODWIN.

It is hereby certified that Letters Patent No. 288,805, granted November 20, 1883, upon the application of Adrian Hitt, of Rushville, Indiana, for an improvement in "Road Carts," was erroneously issued to Terrence McManus as owner of the entire interest; that the said Letters Patent should have been issued to the said *Adrian Hitt and Terrence McManus jointly*, said McManus being assignee of one-half interest only; and that the said Letters Patent should be read with this correction therein that the same may conform to the record of the case in the Patent Office.

Signed, countersigned, and sealed this 15th day of February, A. D. 1887.

[SEAL.]
                  D. L. HAWKINS,
                   *Acting Secretary of the Interior.*

Countersigned:
 R. B. VANCE,
   *Acting Commissioner of Patents.*